United States Patent [19]

Lyman

[11] Patent Number: 4,671,821
[45] Date of Patent: Jun. 9, 1987

[54] EXTRACTING COBALT FROM AQUEOUS SOLUTIONS CONTAINING NICKEL WITH MONO-ESTER OF BENZYLPHOSPHONIC ACID

[75] Inventor: Dale E. Lyman, Bumpass, Va.

[73] Assignee: Albright & Wilson Inc., Old Tappan, N.J.

[21] Appl. No.: 526,766

[22] Filed: Aug. 26, 1983

[51] Int. Cl.$^4$ .............................................. C22B 23/04
[52] U.S. Cl. ................................. 75/101 BE; 423/139; 423/DIG. 14; 75/108; 75/119; 210/688
[58] Field of Search ...................... 423/139, DIG. 14; 75/119, 101 BE, 101 R, 108, 117; 210/688

[56] References Cited

U.S. PATENT DOCUMENTS

| | | | |
|---|---|---|---|
| 3,966,569 | 6/1976 | Reinhardt et al. | 423/139 |
| 4,196,076 | 4/1980 | Fujimoto et al. | 423/139 |
| 4,242,314 | 12/1980 | Motoba et al. | 423/139 |
| 4,246,240 | 1/1981 | Ogata et al. | 423/139 |

Primary Examiner—John Doll
Assistant Examiner—Robert L. Stoll
Attorney, Agent, or Firm—Frishauf, Holtz, Goodman & Woodward

[57] ABSTRACT

A process for extracting cobalt values from an aqueous solution also containing another metal such as nickel, with an extractant comprising alkyl benzylphosphonic acid is disclosed. An organic solvent such as a low aromatic kerosene can be employed for dilution and dissolution of the extractant.

18 Claims, No Drawings

EXTRACTING COBALT FROM AQUEOUS SOLUTIONS CONTAINING NICKEL WITH MONO-ESTER OF BENZYLPHOSPHONIC ACID

BACKGROUND OF THE INVENTION

1. Field of the Invention

This invention relates to a method for extracting cobalt values from aqueous solutions also containing nickel or other metal values using a mono-ester of a benzylphosphonic acid as the extractant.

2. Description of the Prior Art

Aqueous solutions containing cobalt and nickel are obtained from various processes, for example, in the hydrometallurgy of ores, the recovery of useful metals from waste catalysts, and the recovery of useful metals from metal scrap. In many cases nickel and cobalt are present together. Therefore an effective method is necessary to separate and recover pure cobalt and nickel from such aqueous solutions. Such processes are described in U.S. Pat. Nos. 4,196,076 and 4,246,240 in which different phosphonic acid esters than used here are contemplated. These patents are incorporated herein by reference, in entirety.

SUMMARY OF THE INVENTION

The process of this invention is an improvement in the method of the extraction of cobalt from aqueous solutions which also contain at least one other metal value, e.g. nickel, by contact with an organic extraction solvent comprising a mono-ester of benzylphosphonic acid as extractant whereby cobalt is extracted from the aqueous solution into the organic phase, and subsequently separating the resultant cobalt loaded organic phase from the aqueous phase.

DESCRIPTION OF THE PREFERRED EMBODIMENTS

This invention relates to a process for extracting cobalt from aqueous solutions, particularly aqueous acid liquors, by the use of an organic extractant containing a benzylphosphonic acid ester having the formula

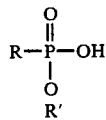

in which

R is benzyl or substituted benzyl, particularly benzyl substituted by a $C_1$–$C_{12}$ hydrocarbon radical benzyl and R' is $C_4$–$C_{12}$ hydrocarbon radical;

The hydrocarbon radicals are preferably aliphatic and can be straight-chained or branced. Most preferably the hydrocarbon radicals are alkyl.

The amount of benzylphosphonic acid ester can vary widely but must be sufficient to absorb substantially all of the cobalt.

In carrying out the process of the present invention, the cobalt-bearing aqueous solution, is contacted either by batch, continuously co-current or continuously counter-current, with the extractant solvent. Packed column, pulse column, rotating disc column, or the like are preferably used in the countercurrent extraction with multiple stages, but any well-known contact equipment generally used for the solvent extraction is available for this invention.

The volume ratio of the organic phase to the water phase which are in contact with each other can be varied over a considerable range. The most effective ratio is dependent on the concentration of the extractant, the organic diluent and the aqueous solution containing cobalt, and on the method of mixing these liquids, such as the type of the equipment. In general, the rates of aqueous to organic phase is from 10:1 to 1:10, although other ratios are believed to be effective, depending upon the specific separation.

An organic solvent is employed in this invention for dilution and dissolution of the above-mentioned extractant. The amount of extractant dissolved in the diluent is generally 5.0 to 50.0 volume percent and preferably 10.0 to 20.0 percent. The solvent should be able to dissolve the extractant to form an organic phase, and should separate from the water phase after the liquid-liquid contact between the cobalt/nickel phase and the solvent phase. The solvent should also be insoluble in water, and should not inhibit the function of the extraction of cobalt from the solution containing cobalt. Effective solvents are distillates of petroleum such as low aromatic kerosene, naphtha and toluene.

After the extraction of cobalt into the organic phase and the separation of the water phase and the organic phase, the cobalt loaded organic phase may be scrubbed to remove the cobalt, thereby enabling the stripped cobalt-free solvent to be recycled to the extraction circuit for treatment of incoming cobalt-bearing solutions. This may be achieved by contacting the loaded solvent with an alkaline or acid solution.

An advantageous characteristic of the phosphonic acid ester extractants of this invention is that they do not substantially partition into the aqueous phase during the separation process thereby reducing costly losses of the extractant.

The phosphonic acid esters used herein can be prepared by methods which are themselves known.

This invention is further illustrated by referring to the following examples based on laboratory tests which are offered only as an illustrative embodiment of the invention and is not intended to be limited or restrictive thereof.

EXAMPLE

An aqueous stream containing 7 gm/l cobalt and 7 gm/l nickel with 5.0 weight percent sulfuric acid was prepared. A 10.0 weight percent solution of the 2-ethylhexyl benzylphosphonic acid extractant prepared in a hydrophobic diluent (refined kerosene). Equal volumes or organic extractant and aqueous stream were added to a separatory funnel. Anhydrous ammonia was added to aqueous phase to adjust the pH of the solution. The separatory funnel was mixed for one minute and the mixture was allowed to separate into two phases (approx. 10 minutes). The pH of the aqueous solution was determined. The concentration of nickel/cobalt was measured in the aqueous phase by atomic absorption. This was repeated at various pH values to determine the extraction coefficient as a function of pH. The data tabulated in the Table demonstrates a high extraction affinity to cobalt and a low extraction affinity to nickel.

TABLE

| Percent Co/Ni Extracted | Final pH of Aqueous Phase | | | | |
|---|---|---|---|---|---|
| | 2.25 | 2.60 | 3.75 | 4.50 | 4.75 |
| Co | 7.5 | 11.5 | 74 | 87 | 90.5 |
| Ni | 0 | 0 | 2 | 3 | 5 |

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

What is claimed is:

1. A process for the selective extraction of cobalt values from an aqueous solution containing cobalt and nickel comprising:
   (a) contacting said solution with an organic extraction solvent containing a phosphonic acid ester extractant having the formula

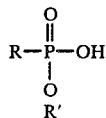

in which R is benzyl or benzyl substituted with $C_1$-$C_{12}$ hydrocarbon radical; and R' is $C_4$-$C_{12}$ a hydrocarbon radical; whereby cobalt is extracted from the aqueous solution into the organic phase; and
   (b) subsequently separating the resultant cobalt loaded organic phase from the aqueous phase.

2. The process of claim 1 wherein from about 0.1 to 10 parts by volume of the aqueous solution are employed per part by volume of the extraction solvent.

3. The process of claim 1 wherein the said extractant further comprises an organic diluent.

4. The process of claim 3 wherein the amount of extractant in the organic diluent is within the range of 5.0 to 50.0 volume percent.

5. The process of claim 3 wherein the diluent is a petroleum distillate.

6. The process of claim 5 wherein the petroleum distillate is a low aromatic kerosene.

7. The process of claim 5 wherein the petroleum distillate is naphtha.

8. The process of claim 5 wherein the petroleum distillate in toluene.

9. The process of claim 1 wherein R is benzyl; and R' is $C_4$-$C_{12}$ alkyl.

10. The process of claim 1 wherein R is benzyl; and R' is 2-ethylhexyl.

11. The process of claim 3 wherein said other metal value is nickel.

12. The process of claim 4 wherein said other metal value is nickel.

13. The process of claim 5 wherein said other metal value is nickel.

14. The process of claim 6 wherein said other metal value is nickel.

15. The process of claim 7 wherein said other metal value is nickel.

16. The process of claim 8 wherein said other metal value is nickel.

17. The process of claim 9 wherein said other metal value is nickel.

18. The process of claim 10 wherein said other metal value is nickel.

* * * * *